Nov. 19, 1929.　　　P. H. GRANGER　　　1,736,117
METHOD AND APPARATUS FOR LOCATING LEAKS IN WELL PIPING
Filed Dec. 28, 1927
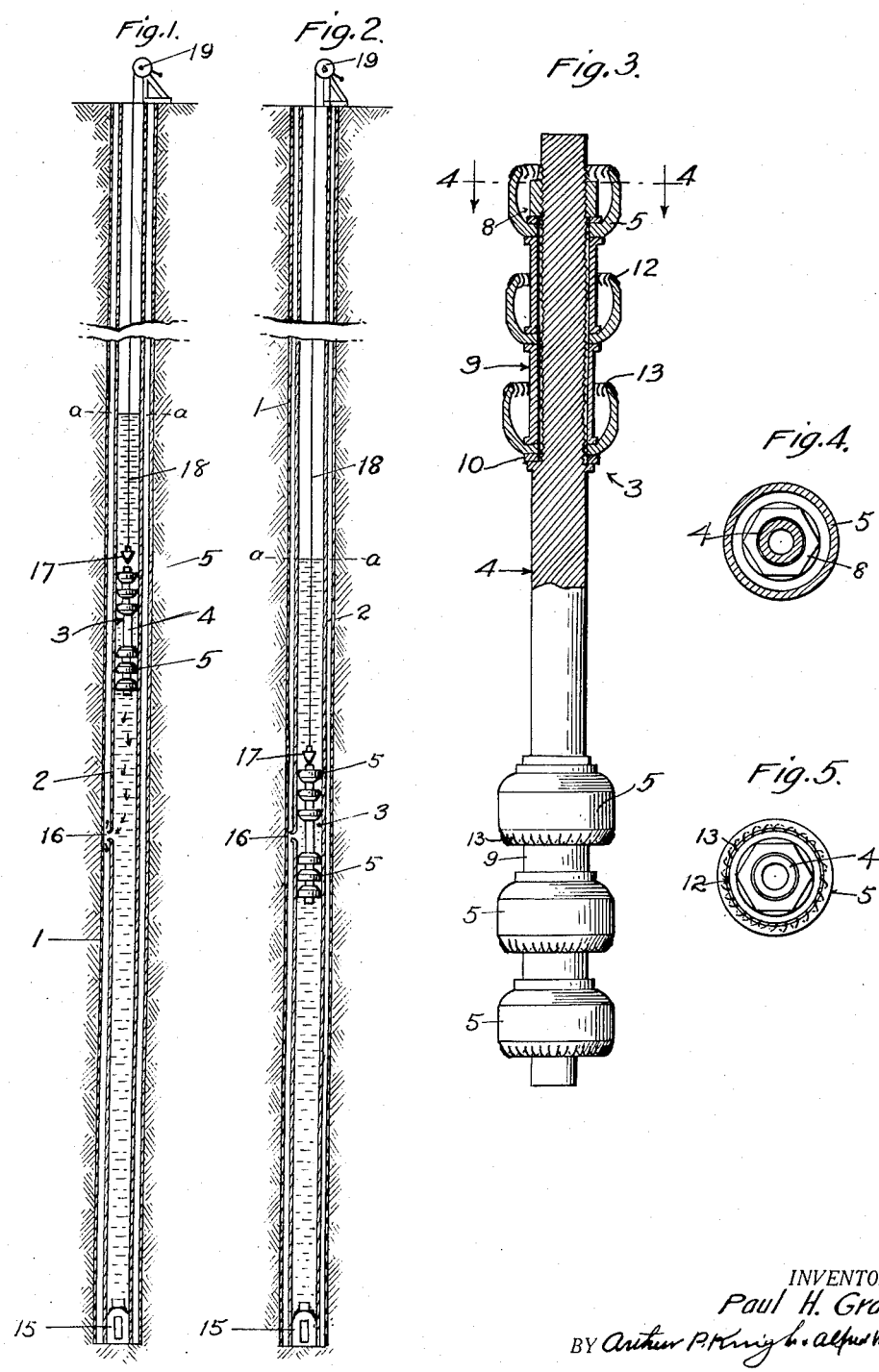
INVENTOR.
Paul H. Granger,
BY
ATTORNEYS Patented Nov. 19, 1929

1,736,117

UNITED STATES PATENT OFFICE

PAUL H. GRANGER, OF LOS ANGELES, CALIFORNIA

METHOD AND APPARATUS FOR LOCATING LEAKS IN WELL PIPING

Application filed December 28, 1927. Serial No. 243,086.

This invention relates to a method and apparatus for locating leaks in well piping and is particularly adapted and intended for the detection and location of leaks in the piping or tubing of oil wells of considerable depth.

The main object of the invention is to provide a method and means for locating leaks in well piping or tubing in an economical manner.

In the operation of oil wells, particularly where they are operating at a great depth, it sometimes happens that a leak occurs in the piping or tubing through which the oil is pumped to the surface and in such cases it is generally necessary to halt the pumping operation and draw the string of piping from the well in order that it may be inspected. To locate the leak such withdrawal of the piping is generally effected slowly so as to enable the piping to be carefully inspected as it is being withdrawn and this involves a very considerable loss of time which represents a correspondingly large monetary loss, particularly where the well has a large output.

My invention provides for locating or detecting the leak in the pipe without withdrawing the pipe from the well hole and with a minimum loss of time and expenditure of labor and money in determining the location of the leak.

The accompanying drawings illustrate embodiments of my invention and referring thereto:

Fig. 1 is a vertical section of the well showing the leak locator descending in the piping in a leak-finding operation.

Fig. 2 is a view similar to Fig. 1 showing the leak locator in its finding position, and the depth gauging means for determining the depths of such position.

Fig. 3 is a side elevation partly in section of the leak-locating device.

Fig. 4 is a section on line 4—4 in Fig. 3.

Fig. 5 is a plan view of the leak locating device.

Referring to Fig. 1, a well casing is shown at 1 and the well piping or tubing is indicated at 2 extending vertically within the casing. The leak detecting or locating device 3 shown in detail in Figs. 3 to 5 consists of a plugging or closure means adapted to slide and fit within the said well tubing or piping 2 and comprising a rod or elongated member 4 of metal or other suitable material provided with packing rings or means for forming a fluid tight fit within the well tubing or piping 2, said means comprising, for example, a series of rings or cups 5 at the upper portion of the member 4 and a series of rings or cups 5 at the lower portion of the member 4. The member 4 constitutes an impervious closure or plugging means between the portions of the well above and below the same and also between said upper and lower portions of the well and the space around the member 4 and between the upper and lower packing rings. Each of the rings or cups 5 may consist of leather or other suitable flexible material pressed into cup or bowl shape and having its central portion clamped between a nut 8 screwing on the threaded portion 10 of the member 4 and a shoulder 10 on said member, said cups being spaced apart by sleeves 9 slipped or threaded on member 4. The rings or cups 5 flare sufficiently from their points of attachment to the member 4 to come into contact or approximately into contact with the walls of the piping or tubing 2 at the portion of greatest diameter of said cups, but above said portion, the rings or cups are preferably tapered so as to form a contracted lip 12 to insure that the cup will pass along the tubing without catching in joints or other uneven places in the tubing. Such contraction of the free edges of the rings or cups may be secured and maintained by lacing the same with wire over the lip or edge thereof as shown at 13, such lacing also serving to protect and guide the free lip or edge of the cup as it passes an obstruction. The rings or cups 5 at the upper end of the member 4 are attached at their lower edges to the member 4 and have their free edges presented upwardly so as to tend to be expanded by pressure exerted from above, whereas the cups 5 at the lower portion of the member 4 are attached at their upper edges to said member 4 and have their free edges presented downwardly so as to tend to be expanded by fluid pressure exerted from below.

The method of using the above described apparatus in detecting a leak in the well may be described as follows: When a leak is known to exist in the well as evidenced, for example, by a decrease in pumping action the sucker rod is withdrawn, the lower end of the well piping 2 being, however, maintained in closed condition by leaving the standing valve therein or by lowering a plug, such closure means being indicated at 15 in Figs. 1 and 2. The leak detecting means shown in Figs. 3 to 5 is then dropped down in the well tubing or piping, said means descending freely and rapidly in the upper portion of the tubing or piping as the packing means 5 are not adapted to make a tight joint or fit with the interior of the tubing under such conditions. When, however, the detector device reaches a column of fluid in the piping its descent is retarded or arrested by the liquid, the pressure of which expands the lower packing means 5 into tight contact with the walls of the well tubing. It is assumed that the level of the liquid indicated at a—a in Fig. 1 is considerably above the leak, this condition being produced by filling the tubing above the level of the leak with a suitable liquid such as oil or water and when the detecting device has entered the liquid column additional liquid, for example water, is introduced into the tubing from the top so as to produce a hydrostatic pressure on top of the detector device which expands the packing means at the upper portion thereof into liquid tight engagement with the walls of the well tubing, and then causes the detecting device to gradually descend as the liquid is forced from the lower portion of the well tubing through the leak indicated at 16. The detecting device will, therefore, descend until its lower packing means passes said leak and encounters an incompressible column of liquid immediately below the leak whereupon the downward movement of the detector device will be automatically arrested. The distance to which the detecting device has descended may be ascertained in any suitable manner, for example by lowering the plumb bob indicated at 17 carried by a line or cable 18 and operated by reel or other means 19, the line or the reel being provided with means for measuring the length of line paid out as the plumb bob descends from the top of the well into contact with the detecting device 3. This measuring operation may proceed concurrently with the gradual descent of the detecting device 3 under the pressure of the column of liquid supplied on top thereof, it being understood that in any case the moment that the plumb bob is arrested by the weight 3 can be readily determined by its effect in decrease in the pull on the line. In case there is more than one leak in the tubing the detector will descend to the lowermost leak and will act as a plug or packer therefor, and a second similar detecting means may then be used in similar manner to detect the next higher leak and so on.

In applying my invention as described to determining the location of a plurality of leaks, the fact that the measuring means 18 is separate and disconnected from the closure means 3, is an important advantage since it enables the measuring means to be withdrawn after the first or lowermost leak is located without disturbing the detector means for said leak and another detector means may then be inserted and lowered until it reaches the next higher leak and the measuring means then again lowered to measure the distance to the second leak and so on.

The special construction of the packing means for the detecting device above described, is desirable for the reason that the well tubing is made in sections secured together by couplings and presenting shoulders or joints which would be liable to catch on the detecting device and interfere with the free descent thereof, if it were not for the rounded shape of the packing means which enables them to slip past such obstructions.

My invention may also be used for locating leaks in deep well casings caused by rotation of drill pipe where the drilling is effected by operation of a rotating vertical shaft or pipe extending down within the casing. It sometimes occurs that said drill pipe in its rotation wears holes in the well casing, causing leaks; and in such case the leak may be located by plugging the lower end of the casing by any suitable plug or packer and then proceeding as above described.

The wire lacing on the free edges of the cups 5 enables the lower cups to pass obstructions, such as shoulders or threads at the joints of the well tube sections, as such lacing engages such shoulders in such manner as to deflect and guide the edge of the cup past the obstruction without catching or injury.

The above described method of locating a leak has the advantage that it detects the leak under the same pressure conditions that exist in normal operation of the pump. In some cases a leak opens up under the pressure sufficiently to prevent effective pumping, but closes when the pressure is removed, so that it cannot be detected by inspection of the tubing; but by my method of locating such a leak will be detected as the location is effected under working pressure.

The leak having been located as above described, suitable steps may be taken to correct the same.

I claim:

1. The method of locating leaks in well tubing in a well hole which comprises sealing the lower end of the tubing, introducing into the tubing a movable well-plugging means, causing said plugging means to descend by weighting the same, so as to permit efflux of liquid through the leak until the plugging means reaches the leak and is arrested by the column of liquid below the leak, and measuring the distance from the top of the well hole to the plugging means in such arrested portion.

2. The method of locating leaks in well tubing which comprises plugging the tubing below the leak, introducing into the well tubing a closure means adapted to move vertically within the tubing and to make liquid tight contact with the walls thereof, introducing liquid into the tubing above said movable closure means to force the same downwardly and to permit efflux of liquid through the leak until said movable closure means reaches the leak and measuring the distance to which said movable closure means has descended.

3. The method of locating a plurality of leaks in well tubing which comprises plugging the lower end of the tubing below the lowest leak, introducing into the tubing a freely falling closure means, introducing liquid into the tubing above said closure means to force the same downwardly, the downward movement of the closure means being continued until it reaches the lowermost leak and being then arrested by stoppage of the leak by said closure means, measuring the distance from the top of the well tubing to the closure means so arrested, withdrawing the measuring means, inserting another freely falling movable closure means and introducing liquid into the tubing to force said closure means downwardly until it reaches the next higher leak in the well tubing and then measuring the distance from the top of the well tubing to said second closure means.

4. Means for detecting leaks in well tubing comprising a movable closure means adapted to be inserted within the tubing and to make liquid tight contact therewith under the pressure of liquid in the tubing, and means for measuring the distance from the top of the well to the top of said movable closure means, said movable closure means being provided with an upper packing means adapted to be forced outwardly against the well tubing by the pressure of the liquid above the same and with a lower packing means adapted to be forced outwardly against the well tubing by the pressure of the liquid below the same and said movable closure means being separate from the measuring means so as to fall freely within the well tubing.

5. A locating device for leaks in well tubing comprising a member having sufficient weight to enable it to descend to the liquid in the well under investigation and provided with an upper packing means adapted to be forced outwardly against the wall of the well tubing by the pressure of the liquid above said packing means and with a lower packing means adapted to be forced outwardly against the wall of the well tubing by the pressure of the liquid below said packing means so as to make a liquid tight contact with the walls of the well tubing at both the lower and upper packing means.

6. Means for detecting leaks in well tubing comprising movable closure means adapted to be inserted within the tubing and to fall freely therein and provided with upper and lower packing means respectively at the upper and lower portions of said closure means adapted to make liquid tight contact with the walls of the tubing under the pressure of the liquid in the tubing, said movable closure means being impervious for passage of liquid therethrough from the space between said packing means to the spaces above and below said closure means.

In testimony whereof I have hereunto subscribed my name this 14th day of December 1927.

PAUL H. GRANGER.